United States Patent [19]

Perry

[11] Patent Number: 4,829,230
[45] Date of Patent: May 9, 1989

[54] MOTOR CONTROL CIRCUIT FOR ACCURATE SPEED CONTROL WITH CAPACITOR LEAKAGE COMPENSATION

[75] Inventor: Joseph E. Perry, Osceola, Ind.

[73] Assignee: Miles Inc., Elkhart, Ind.

[21] Appl. No.: 141,065

[22] Filed: Dec. 18, 1987

[51] Int. Cl.⁴ .......................................... G05F 1/567
[52] U.S. Cl. ..................... 323/273; 323/265; 323/280; 323/901; 494/84; 388/833; 388/902; 388/921; 388/934; 388/916
[58] Field of Search ............. 323/901, 907, 265, 273, 323/280; 318/317, 334, 342, 331; 494/84

[56] References Cited

U.S. PATENT DOCUMENTS

| | | | |
|---|---|---|---|
| 2,929,980 | 3/1960 | Anger | 318/391 |
| 3,777,234 | 12/1973 | Luger | 318/334 |
| 4,008,426 | 2/1977 | Ogura | 318/331 |

FOREIGN PATENT DOCUMENTS 153582  9/1982  Japan ..................... 318/334

OTHER PUBLICATIONS

"IC Power Supply", Elektor, vol. 5, No. 2, pp. 26-30, Feb. 1977.
"Mini Drill Speed Control," Elektor, vol. 6, No. 1, pp. 1-16 and 1-17, Jan. 1980.

Primary Examiner—William H. Beha, Jr.
Attorney, Agent, or Firm—Roger N. Coe

[57] ABSTRACT

A slow start motor control circuit for applications wherein extremely accurate speed control is required, such as, in a centrifugal blood separator application is disclosed. In a blood separator, the degree of separation of cellular components, such as red blood cells and platelets, from the blood plasma is a function of the rotational speed of the centrifuge and the spin time. The control circuit controls the spin time and the rotational speed of the drive motor by controlling the voltage applied to the motor. The control circuit allows the drive motor to start relatively slowly to avoid cell breakage which can contaminate the plasma. After the centrifuge attains its desired operational speed, the speed of the motor is regulated and is relatively uninfluenced by ambient temperature variations.

14 Claims, 1 Drawing Sheet

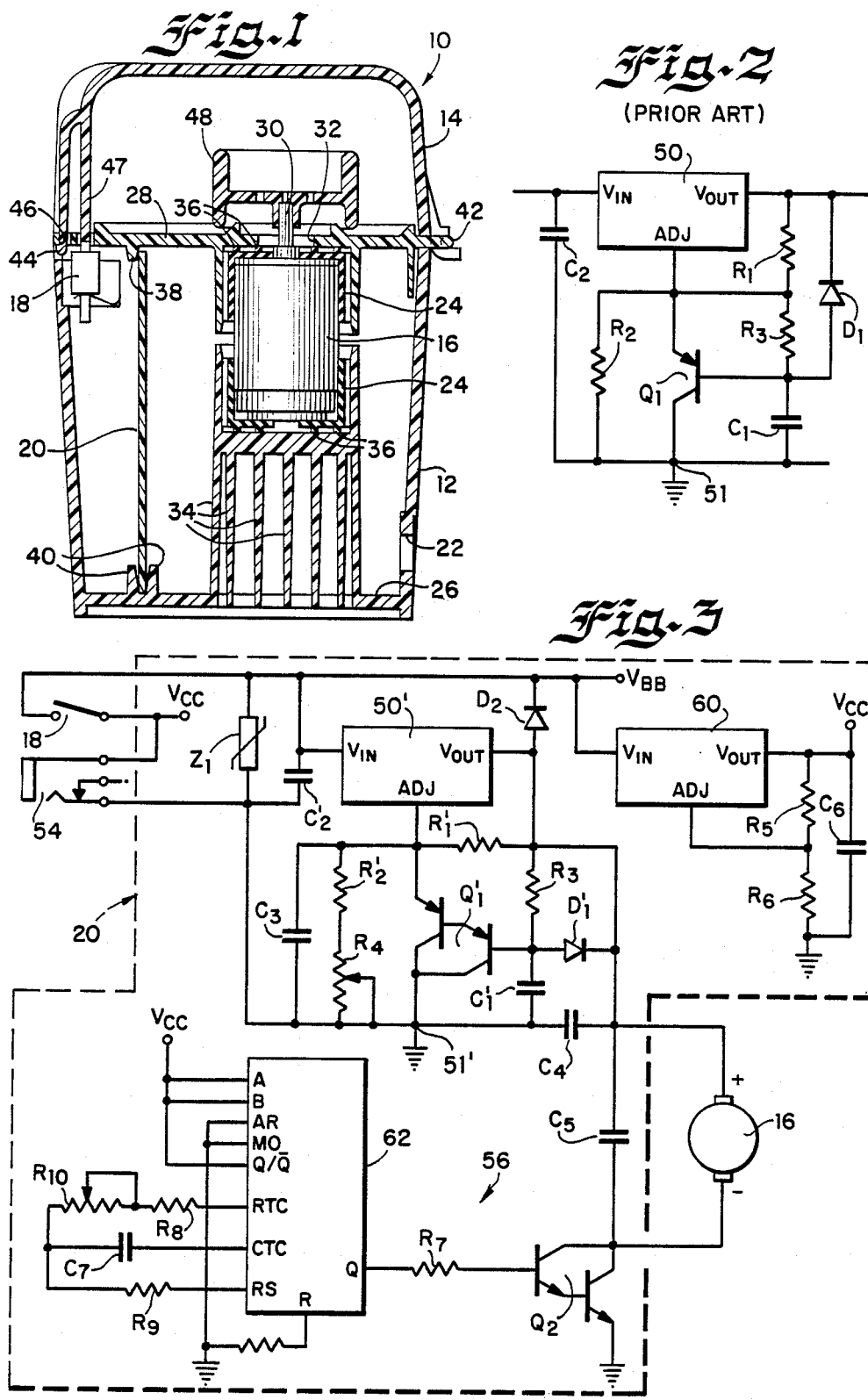

MOTOR CONTROL CIRCUIT FOR ACCURATE SPEED CONTROL WITH CAPACITOR LEAKAGE COMPENSATION

BACKGROUND OF THE INVENTION

1. Field of the Invention

This invention generally relates to a motor control system particularly suitable for applications wherein the motor must be very accurately controlled as in the case of an apparatus for separating cellular components, such as red blood cells and platelets, from blood plasma by centrifugation. More specifically, the invention relates to a control circuit for a centrifuge for improving the degree of separation of the cellular components from the plasma.

2. Description of the Prior Art

Various motor control circuits usable with centrifugal blood separators are known. Generally, such motor control circuits control the separation apparatus to separate cellular components, such as red blood cells and platelets, from plasma. Once the plasma is separated, various tests can be performed to detect, for example, triglycerides, potassium or cholesterol in the blood. The accuracy of such tests is a function of the degree of separation of the cellular components from the plasma which depends on a variety of factors. The most important factors are the rotational speed of the centrifuge and the spin time. More specifically, the degree of separation of the cellular components from the plasma is primarily dependent upon the product of the rotational speed of the centrifuge and the spin time or time of operation of the centrifuge. Blood separators which are operated at relatively low speed time products do not result in adequate separation (e.g., red blood cells and platelets remain in the plasma). When blood separators are operated at relatively high speed time products, the degree of separation is relatively unaffected although problems have resulted.

A sample cup is located within the centrifuge and is adapted to receive the whole blood to be separated. The sample cup is carried by a holder which is coupled to the shaft of the centrifuge drive motor and thus is rotated at the same speed as the motor shaft. When the centrifuge is operated at a relatively high speed the sample cup may rupture due to internal pressure and consequently leak.

Other factors also affect the degree of separation of the cellular component from the plasma. For example, the drive motor acceleration can affect the degree of separation. Specifically, when the drive motor is accelerated too rapidly, several problems can result such as, air bubbles being trapped and breakage of red blood cells. Broken red blood cells can adversely affect some tests, such as the potassium test. Also rapid deceleration of the drive motor can result in remixing of the plasma and the red blood cells in the sample cup.

Moreover, certain factors which may not affect the degree of separation can have an adverse impact on the blood separator itself. For example, operating the blood separator at a relatively high speed does not significantly affect the degree of separation but does affect the life of the drive motor. Specifically the motor bearing and brush wear are dependent upon the speed of the motor and the load. Consequently, operating the blood separator at a relatively high speed will shorten the effective motor life. On the other hand, operation of the blood separator at too low of speed, irrespective of the spin time, can result in inadequate separation.

Various attempts have been made to control the plasma quality by controlling the speed of the centrifuge drive motor and the spin time. For example, in one blood separator apparatus, an interval timer was used to control the spin time by permitting the motor to be energized for a predetermined amount of time each time electrical power was applied to the motor. However, due to the poor regulation of the source of electric power for the motor, the speed of the motor varied substantially. As such, the variation in motor speed produced unacceptable and unpredictable results.

Another attempt to control the speed time product of a blood centrifuge included a servo system having a motor speed detector connected in a feedback circuit. In that system the actual motor speed is detected by a speed transducer and compared with a speed command signal. The difference between the actual speed and the command speed is used to generate an error signal which, in turn, is used to increase or decrease the motor speed to reduce the error. Although such a system adequately controls the voltage and consequently the speed of the centrifuge drive motor, it requires the use of a motor speed transducer, such as a tachometer, which can be quite expensive. However, it is known by those of ordinary skill in the art that the speed of a DC motor can also be determined by measuring the back EMF of the motor. Since the back EMF is directly proportional to the speed of the motor a speed transducer can be eliminated. However, unless the source of electrical power to the motor is regulated, variations in the voltage can cause the back EMF detection circuits to vary substantially which will in turn affect the motor speed.

Another alternative is to utilize a regulated voltage supply for the motor. However, as will be discussed below in connection with the description of FIG. 2, known regulated voltage regulator circuits can be temperature dependent. Specifically, some known voltage regulator circuits require the use of external capacitors. It is well known in the art that the charge on a capacitor operated with a direct current voltage can leak. It is also known that the leakage current increases approximately exponentially with increasing temperature. As will be discussed in connection with the description of FIG. 2, the capacitor leakage current can cause errors in the regulated output voltage. Consequently, since the speed of the motor is proportional to the voltage applied to its terminal, such variations, which are temperature dependent, can cause variations in the motor speed and consequently affect the degree of separation of the cellular components from the plasma.

SUMMARY OF THE INVENTION

It is an object of the present invention to provide a highly accurate motor control system particularly usable with apparatus such as blood separators and other devices that require precise motor control.

It is another object of the present invention to solve the problems associated with the prior art centrifugal blood separators used to separate cellular components, such as red blood cells and platelets from the plasma.

It is another object of the present invention to provide a control circuit for a centrifugal blood separator for adequately separating the cellular components from the blood plasma by controlling the rotational speed of the centrifuge and the spin time.

It is yet another object of the present invention to provide a control circuit for a centrifugal blood separator to control the acceleration of the centrifuge to reduce contamination of the plasma resulting from broken red blood cells.

It is yet another object of the present invention to provide a control circuit for a centrifugal blood separator for controlling the speed of the centrifuge such that the life of the motor will be optimized.

It is another object of the present invention to provide a control circuit for a centrifugal blood separator for maintaining a minimum rotational speed to insure proper separation of the cellular components from the plasma.

Briefly, the invention relates to a highly accurate motor control system particularly usable with a centrifugal blood separator. Specifically, the invention relates to a control circuit for controlling the speed of the centrifuge and the spin time to provide an acceptable and predictable degree of separation of cellular components, such as red blood cells and platelets, from the blood plasma. The centrifugal blood separator includes a drive motor having a sample cup holder which is directly coupled to the shaft of the drive motor. Blood samples taken by, for example, venipuncture techniques are deposited into the sample cup which may be disposable. Once the sample cup is placed in the sample cup holder, it rotates at the same rotational speed as the centrifugal drive motor when the unit is operating. The control circuit allows the motor to "slow start" or gradually attain rated speed to reduce cell breakage which can contaminate the plasma. The control circuit also insures that the motor speed does not fall below a predetermined minimum speed which can result in inadequate separation of the cellular components from the plasma. An important aspect of the present invention relates to the ability of the control circuit to accomplish its objectives relatively independent of ambient temperature variation. Known voltage regulator circuits used to control the speed of a DC motor often contain electrical components, such as capacitors and transistors whose performance varies as a function of temperature. Thus many prior art circuits can provide spurious or unpredictable operation resulting in inadequate blood separation when the temperature fluctuates. The present invention solves this problem by providing a relatively stable voltage regulator even during fluctuating ambient temperature conditions.

BRIEF DESCRIPTION OF THE DRAWING

These and other objects and features of the present invention will become better understood from the following description with reference to the accompanying drawing in which:

FIG. 1 is a cross-sectional view of a centrifugal blood separator in accordance with the present invention;

FIG. 2 is a schematic of a prior art voltage regulator control circuit; and

FIG. 3 is a schematic of a voltage regulator control circuit for a blood separator in accordance with the present invention.

DETAILED DESCRIPTION

The present invention relates to a centrifugal blood separator, generally identified by the reference numeral 10, which is used to separate cellular blood components, such as red blood cells and platelets from plasma. Once the cellular components are separated from the plasma, certain tests can be performed on the plasma for detecting the presence of triglycerides, potassium, cholesterol and the like in the blood.

Referring to FIG. 1, a centrifugal blood separator 10, in accordance with the present invention, is illustrated. The blood separator 10 is enclosed in a housing 12 having a mating cover 14. The housing 12 can be made by conventional injection molding techniques and molded with cavities for mounting of a drive motor 16, an interlocking cover switch 18, a printed circuit board 20, upon which the control circuit is mounted, and a power jack (not shown). The unit is adapted to be plugged into a standard 120 volt AC receptacle via the power jack.

The housing 12 is generally cylindrical in shape and is open on one end. The housing 12 can be made from conductive plastic or painted with a conductive coating to reduce radio frequency interference and electromagnetic interference. An aperture 22 located in the side wall of the housing 12 near the bottom is adapted to receive the power jack (not shown). A motor mount 24 is mounted generally vertical within the housing 12. The motor mount 24 is rigidly held between the floor 26 of the housing 12 and a top plate 28 which closes the opening in the housing 12. The motor mount 24 carries the drive motor 16 in a relatively vertical position such that the shaft 30 of the motor 16 extends through an opening 32 in the top plate 28.

The motor mount 24 can be molded from a relatively flexible material. The motor mount 24 has a plurality of radial ribs 34, which are adapted to flex to accommodate tolerances in the motor and cavity dimensions and to isolate vibrations from the housing 12 due to unbalanced loads. The motor mount 24 also has a plurality of vertical protuberances 36 which are compressed when the top plate 28 is mounted to the housing 12. In operation, the ribs 34 flex to accommodate deflection in the drive motor 16 due to vibration.

In addition to holding the drive motor 16 in place, the top plate 28 also holds the printed circuit board 20, upon which the novel control circuit is mounted, and the cover switch 18 in place. An inwardly projecting protuberance 38 from the top plate 28 cooperates with a pair of protuberances 40, located on the floor 26 of the housing 12 to hold the printed circuit board 20 in a relatively vertical position.

The cover 14 is attached to the top plate 28 via a hinge pin 42 located at an end portion of the top plate 28 which extends outwardly from the housing 12 to allow the cover 14 to be placed in an open position and a closed position. The cover 14 includes a latch 44 which cooperates with a catch 46 within the top plate 28 to latch the cover 14 in a closed position.

The cover switch 18 is interlocked with the cover 14 to isolate the operator from the blood sample when the drive motor 16 is running. More specifically, a protuberance 47, which is integrally molded with the cover 14, actuates the cover switch 18 when the cover 14 is placed in a closed position to permit the motor 16 to be started. When the cover 14 is placed in an open position, the motor 16 is prevented from starting.

A cup holder 48 is used to carry a disposable sample cup (not shown) containing the whole blood to be separated. The sample cup holder 48 is directly coupled to the motor shaft 30. The cup holder 48 transfers rotational energy of the motor shaft 30 to the sample cup.

FIG. 2 illustrates a known control circuit for providing a regulated output voltage $V_O$, for example, for controlling the speed of the drive motor 16. As previously discussed, it is important that the drive motor 16 develop a minimum speed to insure adequate separation of the cellular components from the plasma. The performance of some known speed control circuits, such as the circuit illustrated in FIG. 2, is affected by temperature and as such, such circuits are unable to accurately control the speed of the motor when there are significant temperature fluctuations As will be discussed below, the circuit illustrated in FIG. 2, utilizes a transistor and a capacitor which are subject to reverse saturation and leakage, respectively. As will be discussed in detail below, transistor reverse saturation current and the capacitor leakage current can affect the output voltage of the voltage regulator circuit and consequently the speed of the drive motor 16. As known by those of ordinary skill in the art, both the transistor reverse saturation current and the capacitor leakage current are temperature dependent.

The circuit illustrated in FIG. 2 utilizes a three terminal adjustable voltage regulator 50, having an input terminal $V_{IN}$, and output terminal $V_{OUT}$ and an adjustment terminal ADJ. The regulator can be a National Semiconductor type regulator Model Nos. LM117, LM217 or LM317.

A resistor $R_1$ is connected between the output terminal $V_{OUT}$ and the adjustment terminal ADJ. A second resistor $R_2$ is connected between the adjustment terminal ADJ and an electrical common point 51, which is grounded. A PNP transistor $Q_1$ is connected in parallel across the resistor $R_2$. Specifically the emitter terminal of transistor $Q_1$ is connected to the adjustment terminal ADJ of the voltage regulator 50 and the collector terminal is connected to common point 51. A third resistor $R_3$ is connected between the emitter terminal and the base of the transistor $Q_1$. A capacitor $C_1$ is connected between the base and the collector terminals of the transistor $Q_1$. A diode $D_1$ is connected between the base of the transistor $Q_1$ and the output terminal $V_{OUT}$ of the voltage regulator 50. Another capacitor $C_2$ is connected between the input terminal $V_{IN}$ of the voltage regulator 50 and the electrical common point 51.

Although the circuit of FIG. 2 can provide for a slow start of the motor 16, the performance is dependent on temperature fluctuations as will be discussed below. Specifically, the voltage regulator 50 utilizes internal feedback to maintain a predetermined voltage, for example, 1.25 volts, between the output terminal $V_{OUT}$ and the adjustment terminal ADJ. The output voltage $V_{OUT}$ is approximately:

$$1.25\left(1 + \frac{R_2}{R_1}\right) + I_{adj}R_2$$

The current $I_{adj}$ is the voltage regulator adjustment current. Since the voltage regulator current $I_{adj}$ changes very little with the voltage regulator line or load changes and its magnitude is normally small when compared to the current through resistor $R_1$, the term $I_{adj} \cdot R_2$ can be ignored for simplicity in determining the output voltage $V_{OUT}$. The output voltage $V_{OUT}$ is thus approximately $$1.25\left(1 + \frac{R_2}{R_1}\right).$$

The 1.25 volts is impressed upon a fixed resistor $R_1$. Consequently, a constant current $I_{R1}$ flows through the resistor $R_1$. A portion of the current $I_{R1}$ flows through the resistor $R_2$, the transistor $Q_1$ and the resistor $R_3$ capacitor $C_1$ network. Designating that portion of the total current $I_{R1}$ which flows through the resistor $R_2$ as $I_{R2}$, the voltage drop across the resistor $R_2$ is $R_2 \cdot I_{R2}$. Therefore, the output voltage $V_{OUT}$ is 1.25 volts + $I_{R2} \cdot R_2$. As will be discussed below, an error occurs as a result of the change in the current $I_{R2}$ which flows through the resistor $R_2$.

In operation, when electrical power is applied to input terminal $V_{IN}$ of the voltage regulator 50, current flows through the resistors $R_1$, $R_2$, and $R_3$ while the capacitor $C_1$ is charging. The current flowing through the resistor $R_3$ causes a voltage drop across the resistor $R_3$ which, in turn, biases the PNP transistor $Q_1$ causing it to conduct while the capacitor $C_1$ is charging. While the transistor $Q_1$ is conducting, the current through the resistor $R_2$ is reduced, thus causing the output voltage of the voltage regulator 50 to be relatively lower than the expected steady state voltage. After the capacitor $C_1$ is charged, the voltage across the transistor $Q_1$ base emitter junction approaches zero thereby cutting off the transistor $Q_1$. However, there is still a small emitter base junction forward bias. Consequently, transistor $Q_1$ continues to operate in the active region having a collector current which is given by: $I_{QC} = -\alpha I_E + I_{CO}$, where $\alpha$ is the large-signal current gain, $I_E$ is the emitter current and $I_{CO}$ is the reverse saturation current. It is well known that the quantities $\alpha$ and $I_{CO}$ are temperature dependent quantities. The expression for the output voltage $V_{OUT}$ of the regulator 50 then becomes (after the capacitor has charged)

$$\begin{aligned}V_{OUT} &= 1.25 + I_{R2} \cdot R_2 \\ &= 1.25 + [I_{R1} - (I_{QC} + I_{C1})] \cdot R_2 \\ &= 1.25\left[1 + \frac{R_2}{R_1}\right] - (I_{QC} + I_{C1}) \cdot R_2\end{aligned}$$

where $-(I_{QC}+I_{C1})R_2$ is dependent on the transistor and capacitor characteristics (both temperature dependent quantities).

The performance of capacitor $C_1$ and is also dependent on temperature fluctuations. Specifically, it is well known that capacitors operated with a DC voltage will exhibit leakage current. Both the capacitor leakage current $I_{CBO}$ and the transistor $Q_1$ reverse saturation current discussed above reduce the magnitude of the current $IR_2$ which in turn, affects the output voltage of the voltage regulator 50 since the output voltage $V_{OUT}$ is a function of the voltage drop across the resistor $R_2$. By reducing the magnitude of current flowing through the resistor $R_2$, an error in the output voltage $V_{OUT}$ results. Since both the transistor reverse saturation current and the capacitor leakage current are temperature dependent, the output voltage $V_O$ of the regulator 50 will thus be influenced by temperature variations.

In operation, the capacitor $C_1$ leakage current is supplied by current through the emitter base junction of the transistor $Q_1$ as well as current through the resistor $R_3$. These currents must be supplied by the current flowing from the output terminal $V_{OUT}$ of the voltage regulator 50 through resistor $R_1$ thus reducing the current available to flow through the resistor $R_2$. Consequently, the output voltage $V_{OUT}$ of the voltage regulator 50 will be affected and hence will be temperature dependent.

The control circuit in accordance with the present invention solves this problem and produces an output voltage which is not as susceptible to temperature variations.

Referring to FIG. 3, like components with primes will be used to designate components corresponding in function to similar components in FIG. 2.

The blood separator 10 is supplied with an external source of DC electrical power which is connected via a jack 54 which is serially connected to the single pole single throw contact of the cover switch 18. As illustrated, the jack 54 is adapted to be inserted into a receptacle of an external source of unregulated DC power which can be derived from an external bridge rectifier (not shown) having a conventional 120 volt line supply applied to its input terminals. As previously discussed, the cover switch 18 is interlocked such that the electrical power can only be applied to the drive motor 16 when the cover is closed. Accordingly, the cover switch 18 prevents electrical power from being applied to the drive motor 16 when the cover is opened to isolate the operator of the blood separator during separation.

A transient voltage suppressor $Z_1$ is connected between a terminal $V_{CC}$ and an electrical common point 51' to limit input voltage being applied to the input of the regulator. An input coupling capacitor $C_2'$ is coupled between the transient voltage suppressor $Z_1$ and is coupled to the input terminal $V_{IN}$ of the adjustable voltage regular 50'. A resistor $R_1'$ is connected between the output terminal $V_{OUT}$ and the adjustment terminal ADJ of the voltage regulator 50'. A transistor $Q_1'$ (shown as a Darlington pair) is connected between the adjustment terminal ADJ and an electrical common point 51' such that the emitter terminal is connected to the adjustment terminal ADJ of the regulator 50' and the collector terminal of the transistor $Q_1'$ is connected to the electrical common point 51'. The base terminal of the transistor $Q_1'$ is coupled to the anode of a diode $D_1'$. The cathode of the diode $D_1'$ is coupled to the output terminal $V_{OUT}$ of the regulator 50'. A resistor $R_3'$ is coupled between the output terminal $V_{OUT}$ of the regulator 50' and the base terminal of the transistor $Q_1'$. The resistors $R_1'$ and $R_3'$ are used to bias the transistor $Q_1'$. A capacitor $C_1'$ is coupled between the base terminal of the transistor $Q_1'$ and the electrical common point 51'. A resistor $R_2'$ is serially connected to an adjustable resistor $R_4$. The serial combination of the resistor $R_2'$ and the adjustable resistor $R_4$ is coupled between the collector and emitter junction of the transistor $Q_1'$. Also coupled between the collector and emitter junction of the transistor $Q_1'$ is a bypass capacitor $C_3$. A diode $D_2$ is coupled between the output terminal $V_{OUT}$ of the voltage regulator 50' and the input terminal $V_{IN}$. The drive motor 16 is coupled between the output terminal $V_{OUT}$ of the regulator 50' and the collector of a transistor $Q_2$. A bypass capacitor $C_4$ is coupled between the electrical common point 51' and the positive terminal of the drive motor 16. A capacitor $C_5$ is connected in parallel with the motor 16. The capacitor $C_5$ is used to suppress electrical noise generated by the motor. The negative terminal of the motor 16 is connected to the collector terminal of a transistor $Q_2$ (shown as a Darlington pair). The emitter terminal of a transistor $Q_2$ is connected to the electrical common point 51'. The base terminal of the transistor $Q_2$ is connected to a timing control circuit for controlling the time that the motor is connected to the source of electrical power. The timing control circuit is generally identified by the reference numeral 56.

The supply voltage for the timing control circuit 56 is closely regulated since variations in the voltage will result in variations in the timing periods. In order to closely regulate the supply voltage to the timing control circuit 56, its voltage is derived from another voltage regulator 60 which is connected such that the transient voltage suppressor $Z_1$ is connected between its input terminal $V_{IN}$ and the electrical common point 51'. A resistor $R_5$ is connected between its output terminal $V_{OUT}$ and the adjustment terminal ADJ of the voltage regulator 60. Another resistor $R_6$ is connected between the adjustment terminal of the regulator 60 and the electrical common point 51'. A capacitor $C_6$ is connected between the output terminal of the regulator 60 and the electrical common point 51'. The output voltage of the regulator 60 is applied to the timing circuit 56. The timing control circuit 56 consists of a programmable timer 62 having a built in oscillator and a multistage binary counter which is clocked at the oscillator frequency. Each time electrical power is applied to the programmable timer 62, the output terminal Q is set high which turns on the transistor $Q_2$ via a current limiting resistor $R_7$ to connect the negative terminal of the drive motor 16 and thus allow the drive motor 16 to run. After the programmable counter 62 counts a predetermined number of pulses from the internal oscillator, the output terminal Q goes low thus causing the transistor pair $Q_2$ to turn off and consequently disconnect the motor 16. An external RC network comprising resistors $R_8$, $R_9$ and capacitor $C_7$ and a potentiometer $R_{10}$ are used to set the oscillator frequency of the timer 62.

Although those of ordinary skill in the art will realize that various types of programmable timers are contemplated for use with the invention, one such timer that can be used is a Motorola type 4541B. In such a counter, the output terminal Q is set high after $2^{16}$ or 32,768 pulses of the internal oscillator. In order to program the timer for a spin time of 60 seconds, for example, the oscillator frequency is set at 546 Hz. This is accomplished by adjusting the values for resistors $R_8$, $R_9$ and $R_{10}$ and the capacitor $C_7$ connected to the terminals RTC, CTC and RS.

In operation, when the cover 14 is closed, the cover switch 18 allows electrical power to be supplied to the control circuit. Once the power is applied, the drive motor 16 is turned on and timing is initiated by the programmable timer 62. The Q output of the programmable timer 62 is held high for a predetermined timing period. After the programmable timer 62 times out, the drive motor 16 is turned off and will not be turned on again unless the power is removed and reapplied. Thus, each time the cover 14 is closed, the programmable timer 62 will control the operation of the drive motor 16 such that it is only energized for a predetermined amount of time.

The speed of the motor is controlled to "slow start" or gradually attain rated speed. As is known by those of odinary skill in the art, the speed of a DC motor is directly proportional to the voltage applied to its terminals. The voltage applied to the drive motor 16 is controlled by the adjustable voltage regulator 50' and associated circuitry described above. An important aspect of the present invention is that the output voltage from the voltage regulator 50 is not affected by capacitor leakage current or transistor reverse saturation current as the circuit illustrated and described in FIG. 2. In the circuit in accordance with the present invention, neither the capacitor leakage current for the capacitor $C_1'$ nor the transistor $Q_1'$ reverse saturation current are supplied from the current flowing through resistor $R_1'$. Rather, both the capacitor leakage current and transistor reverse saturation current are supplied through resistor $R_3$ from the voltage regulator output terminal $V_{OUT}$ after the capacitor has charged. The output voltage $V_{OUT}$ of the voltage regulator 50' is thus given by the following expression:

$$V_{OUT} = 1.25 \left[ 1 + \frac{R_2' + R_4}{R_1} \right]$$

Accordingly, the capacitor leakage current and transistor reverse saturation current have no affect on the steady state output voltage of the voltage regulator 50' in this improved design.

After the capacitor $C_1'$ has fully charged, the voltage across it will very nearly equal the output voltage $V_{OUT}$. Since the transistor emitter voltage is approximately 1.25 volts less than $V_{OUT}$, the transistor emitter base junction will be reverse biased. With the emitter base and collector base junctions of the transistor $Q_1'$ both reverse biased, the transistor will be in the cut-off region of operation. Hence, the emitter current $I_E$ becomes zero and the transistor collector current consists entirely of the small reverse saturation current $I_{CO}$ supplied through the transistor base terminal.

In operation, when power is first applied, the voltage across the base emitter junction $V_{BE}$ of the transistor $Q_1'$ and the voltage $V_C$ across the capacitor $C_1'$ are equal to zero. The internal feedback circuit in the voltage regulator 50' will attempt to keep the voltage across $R_1'$ constant; for example 1.25 volts. A constant voltage across a fixed resistor $R_1'$ will result in a constant current of 1.25 volts/$R_1'$ flowing through the resistor $R_1'$. The voltage at the adjustment terminal ADJ of the voltage regulator 50' will rise to about 1.2 volts. When the voltage at the adjustment terminal rises to about 1.2 volts the transistor $Q_1'$ turns on. Since the voltage across the emitter base junction of the transistor $Q_1'$ is constant while the transistor $Q_1'$ is in the active region and since the voltage across the resistor $R_1'$ is constant, the current through the resistor $R_3$ is also constant. Consequently, a constant current flows into the capacitor $C_1'$ resulting in a linear voltage rise across the capacitor $C_1'$ according to the well known relationship wherein $V_C = \int i dt$: Consequently the differential voltage drop across the capacitor $C_1$ is equal to $$dV_c = \frac{1}{c} i dt.$$

Rearranging the terms results in the expression:

$$\frac{dV_c}{dt} = \frac{1}{c}$$

for i equal to a constant. Thus, the voltage across the capacitor $C_1'$ rises in a linear fashion until the voltage across the capacitor $C_1'$ becomes greater than $V_{OUT}$ [−1.25 volts (the voltage at the output terminal) −1.2 volts (the voltage at the adjustment terminal)] and the transistor $Q_1'$ cuts off.

Thus it should be apparent that an improved blood separator has been disclosed wherein the speed of the centrifuge can be accurately controlled and is relatively not affected by temperature dependent circuit variables, such as transistor reverse saturation current and capacitor leakage current. The system can be implemented in a number of ways, all of which are contemplated within the scope of the appended claims.

Obviously, many other modifications and variations of the invention as hereinbefore set forth can be made without departing from the spirit and scope thereof.

What is claimed and desired to be secured by Letters Patent of the United States is:

1. A control circuit for a centrifuge coupled to a drive motor for controlling the speed of the drive motor comprising:
   a voltage regulator having an input terminal adapted to receive an unregulated source of electrical power, an output terminal at which a regulated output voltage is produced and a third terminal;
   a first resistor coupled between said output terminal and said third terminal;
   a second resistor coupled between said third terminal and an electrical common point;
   means coupled to said first resistor, said second resistor and said voltage regulator including a capacitor for delaying the production of the expected output voltage at the output terminal of said voltage regulator after an unregulated source of electrical energy is applied to the input terminal of said voltage regulator; and
   means coupled between said output terminal and said capacitor for minimizing the effects of any leakage current from said capacitor from affecting the expected output voltage.

2. A control circuit as recited in claim 1 wherein said capacitor is coupled between said electrical common point and said third terminal and said output terminal.

3. A control circuit as recited in claim 2 including means coupled between said output terminal of said voltage regulator and said capacitor for providing current equivalent to the capacitor leakage current.

4. A control circuit as recited in claim 3 wherein said current providing means includes a third resistor.

5. A voltage regulation circuit comprising:
   a three terminal adjustable voltage regulator having an input terminal for receiving an unregulated source of electrical power and an output terminal for providing a relatively constant voltage at said output terminal and an adjustment terminal;
   first means for providing electrical resistance, coupled between said output terminal and said adjustment terminal;
   second means for providing electrical resistance, coupled between said adjustment terminal and an electrical common point, wherein said voltage at said output terminal is determined by the amount of electric current flowing through said second means;
   means coupled to said first means, said second means and said output terminal including a capacitor for allowing the output voltage at said output terminal to gradually attain its expected voltage after an unregulated source of electrical power is applied to the input terminal of said voltage regulator; and
   means coupled between said output terminal and said capacitor for supplying electrical leakage current to said capacitor independent of the electrical current to said capacitor independent of the electrical current flowing through said second means.

6. A voltage regulation circuit as recited in claim 5, wherein said allowing means includes switching means coupled to said second means and further includes means for initially shunting said second means.

7. A voltage regulation circuit as recited in claim 6 wherein said switching means includes a Darlington pair having a base terminal, collector terminal and an emitter terminal.

8. A voltage regulation circuit as recited in claim 6 further including means for open circuiting said switching means when said capacitor is charged.

9. A voltage regulation circuit as recited in claim 7 wherein said capacitor is coupled between said base terminal of said Darlington pair and said electrical common point.

10. A voltage regulation circuit as recited in claim 6 further including means for supplying electrical reverse saturation current to said switching means independent of the electrical current flowing through said second means.

11. A voltage regulation circuit comprising:
   a voltage regulator having at least an input terminal, an output terminal and a third terminal for providing relatively constant voltage at said output terminal;
   at least one capacitor coupled to said output terminal of said voltage regulator for allowing the output voltage of said voltage regulator to gradually attain its expected voltage;
   means coupled between said voltage regulator and said capacitor for compensating leakage current from said capacitor;
   a first resistor coupled between said output terminal and said third terminal and a second resistor coupled between said third terminal and an electrical common point, wherein the regulated output voltage is a function of the current flowing through said second resistor;
   switching means, coupled to said second resistor for initially shunting said second resistor, wherein said switching means opens circuits once said capacitor is charged wherein said switching means includes a Darlington pair having a base terminal, collector terminal and an emitter terminal;
   wherein said capacitor is coupled between said switching means and said electrical common point;
   and a third resistor coupled between said capacitor and said output terminal of said voltage regulator.

12. A voltage regulation circuit as recited in claim 11 wherein said third resistor is sized to provide a current equivalent to the capacitor leakage current.

13. A voltate regulation circuit as recited in claim 11 said current provided from said third resistor is derived from current flowing from said third terminal of said voltage regulator.

14. A voltage regulation circuit as recited in claim 13 wherein the voltage at said output terminal is relatively more positive than the voltage at said third terminal.

* * * * *